United States Patent [19]

Stewart, Jr.

[11] 4,209,224
[45] Jun. 24, 1980

[54] PRISMATIC BEAM ROTATOR FOR AN OPTICAL BEAM PROJECTOR

[75] Inventor: George W. Stewart, Jr., Costa Mesa, Calif.

[73] Assignee: Ford Aerospace & Communications Corp., Dearborn, Mich.

[21] Appl. No.: 948,927

[22] Filed: Oct. 5, 1978

Related U.S. Application Data

[63] Continuation-in-part of Ser. No. 859,616, Dec. 12, 1977.

[51] Int. Cl.² .............................................. G02B 27/17
[52] U.S. Cl. ...................................... 350/6.4; 350/6.6; 244/3.13
[58] Field of Search ......................... 350/6.4, 6.6, 6.91; 244/3.13; 356/152

[56] References Cited

U.S. PATENT DOCUMENTS

| | | | |
|---|---|---|---|
| 4,020,339 | 4/1977 | Gustafson | 244/3.13 |
| 4,123,165 | 10/1978 | Brown et al. | 356/141 |

*Primary Examiner*—Theodore M. Blum
*Attorney, Agent, or Firm*—Paul K. Godwin, Jr.; Clifford L. Sadler

[57] ABSTRACT

A beam projector which is controlled to alternately transmit rectangular cross-sectional beams substantially parallel to a projection axis, wherein the beams are respectively pulse modulated over a correspondingly distinct pulse rate frequency range to supply yaw and pitch information and are respectively scanned in a direction correspondingly orthogonal to the cross-sectional length of each beam. The size format of the beam cross-sections and the angles of scan are controlled according to a predetermined time variable function. In a first time period, the largest cross-sectional beams are alternately transmitted and the scan angle is decreased as a function of time, so that a fixed area of detectable information is available for detection with respect to an imaginary orthogonal reference plane moving along the projection axis at a rate corresponding to the predetermined time variable function. In subsequent time periods proportionately smaller cross-sectional beams are transmitted and the scan angle is continually controlled. The disclosed embodiment employs the use of a single set of proportionately different size formatted cross-sectional laser sources as a radiation generator, a scanning mechanism, a vibrationally modulated Pechan type prism and a fixed focus optical system to effect alternately transmitted beams, of selectable cross-section, orthogonally oriented and scanned with respect to each other.

8 Claims, 7 Drawing Figures

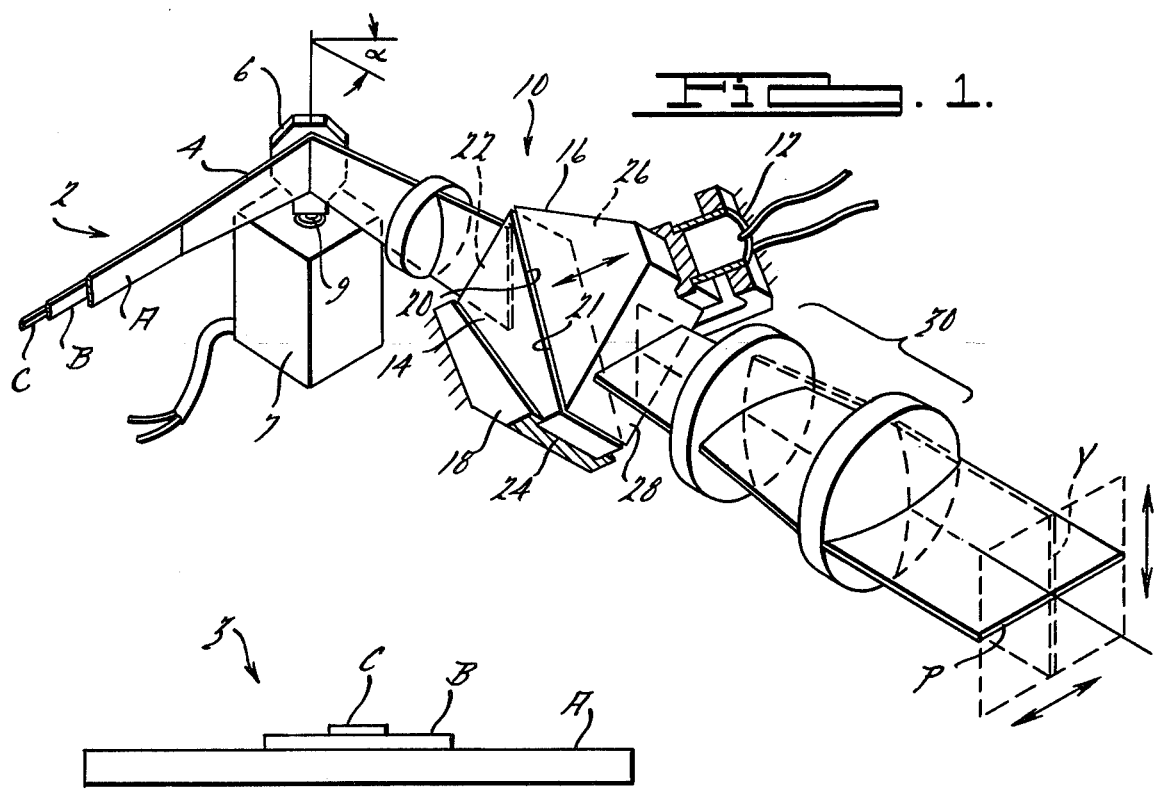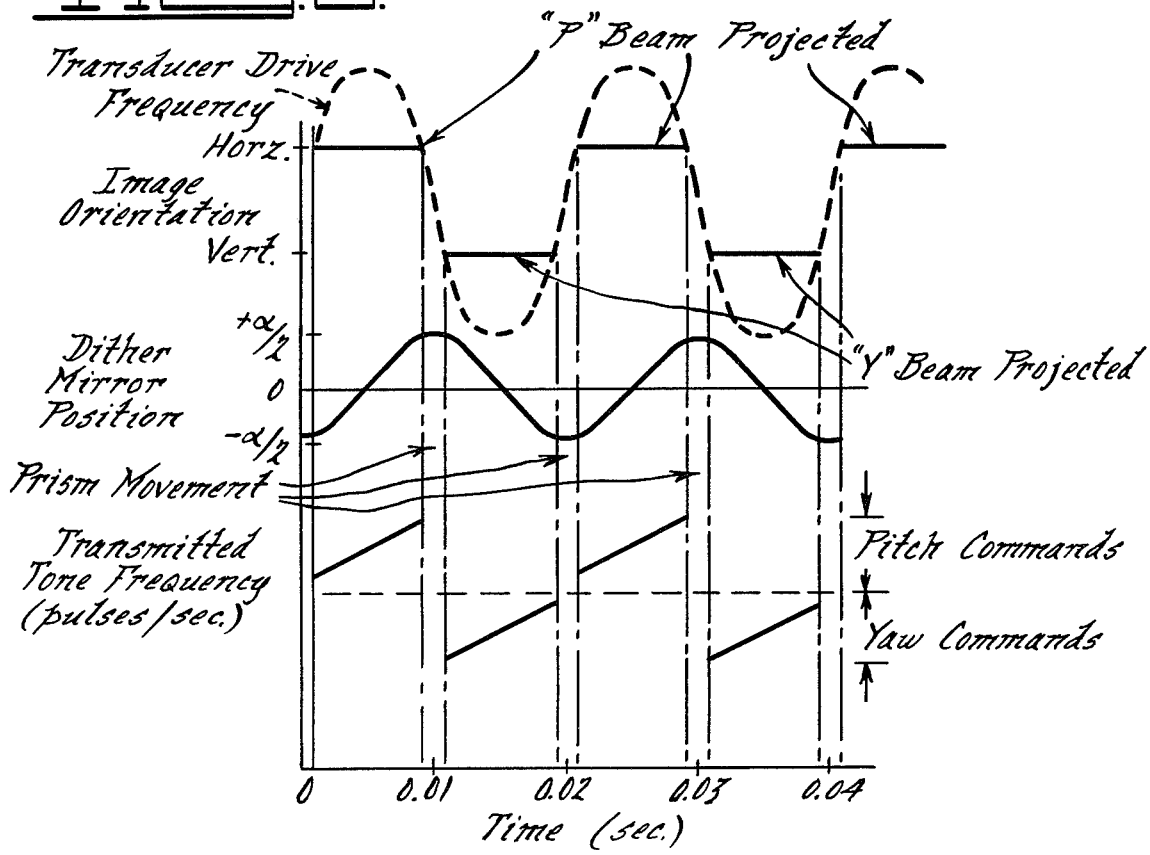

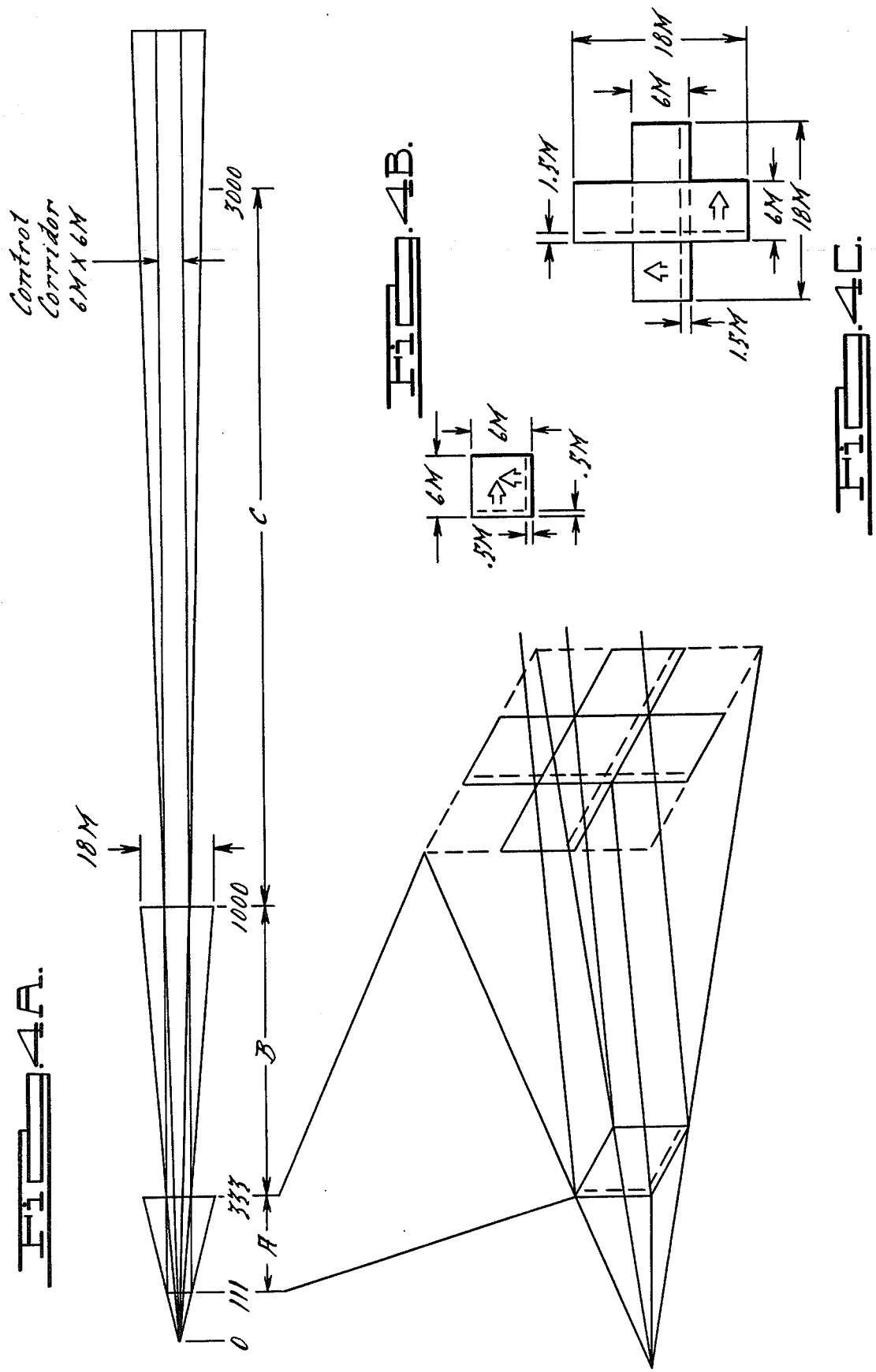

PRISMATIC BEAM ROTATOR FOR AN OPTICAL BEAM PROJECTOR

This is a continuation-in-part of copending U.S. application Ser. No. 859,616, filed Dec. 12, 1977.

The present invention relates to the field of information transmission employing an optical beam projector which supplies coordinate reference information to a remote receiver. More specifically, the present invention relates to the use of a vibrationally modulated Pechan type prism in an optical beam projector of the type described below.

In a prior art reference issued to Girault (U.S. Pat. No. 3,398,918) two embodiments of optical systems are proposed for guiding projectiles. In the first embodiment, four fan-shaped beams are independently modulated and projected towards a target and thereby form four optical walls of a pyramidal corridor for guiding projectiles. The size of the downrange corridor is controlled by a servo driven zoom lens arrangement. A projectile launched into this system tends to guide itself by bouncing around inside the corridor. In a second embodiment disclosed in the Girault reference, a proportional guidance system provides two perpendicularly oriented beams which sweep in directions perpendicular to each other in order to direct the projectile. In the second embodiment, the two beams are derived from a single light source and optically divided, respectively modulated and projected by a controlled zoom lens type system wherein the optical elements are physically reoriented with respect to each other.

The present invention is directed to an improved electromagnetic radiation beam projector which eliminates the zoom lens system of the prior art and achieves more accurate control of the beam size projected in accordance with a time function. This projector is used, for instance, in a beam rider missile system, wherein the missile or projectile contains tail sensors which utilize the projected beam of radiation as a means of controlling its directional flight. By determining its relative location within the cross-section of a projected beam pattern, the missile responds by steering itself to seek the center of the beam pattern. In order to control the flight path of a missile having a known flight profile (distance from launch versus time), it is most desirable to project a matrix pattern so that the cross-sectional area of information is maintained constant over the known flight profile.

The projected scan pattern of the present invention is formed by two alternately scanned and orthogonally oriented beams of radiation which are pulse modulated over respective predetermined ranges of pulse rates to present a plurality of measurable pulse rates at predetermined relative coordinates, termed "bins", within the defined matrix.

A first beam, having a predetermined rectangular cross-sectional area, is projected so that its length dimension is horizontal to a reference and is vertically scanned over a predetermined number of rate values within a first predetermined range of rates during its vertical scan over the predetermined angle.

A second beam, having the same predetermined rectangular cross-sectional area as the first beam is, in alternation with the first beam, oriented vertically with respect to the aforementioned reference and is scanned horizontally over the same predetermined angle to cover an area common to the vertically scanned area of the first beam. The second beam is also pulse modulated at a predetermined number of different rate values within a second predetermined range of rates during its horizontal scan over the predetermined angle.

As a result, a matrix information pattern is projected which has a number of detectable bins corresponding to a particular vertical scan pulse rate and a horizontal scan pulse rate. For example, where the scanned beams are each pulse modulated at 51 different frequencies, 2,601 bins are defined in the matrix. In addition, since the scan beams are each pulse modulated over separate ranges (e.g., 10.460–11.682 KHz for the vertical scan and 13.089–15.060 KHz for the horizontal scan), a discriminative receiver within the matrix can readily determine its position in that pattern.

The improved beam splitter optical projection system described herein includes a vibrationally modulated Pechan type prism to alternate the orthogonal orientation and scan directions of the beams prior to projection. The frequency of modulation is the same frequency as applied to the dither mirror and causes the two prism elements defining the Pechan type prism to synchronously make and break contact along opposing facing surfaces once each cycle.

In the disclosed embodiment, a single source of radiation is employed consisting of three selectively driven lasers which are individually coupled to corresponding fiber optic systems cross-sectionally formatted to deliver radiation in any of three separately selectable cross-sectional densities. In this single source of radiation, the lasers are individually and selectively driven so that only one is on at a time. Therefore, the output of the single source of radiation has a selectable cross-sectional density and is a key factor in eliminating the need for variable optical systems (zoom lenses) of the prior art.

Radiation, emitted from the single source, is fed to a scanning means such as a dither mirror which provides lateral scanning movement of the generally rectangular cross-sectional radiation over predetermined angles at a fixed scan frequency. The scanned radiation is then fed to an improved beam rotator optical projection system, wherein, in synchronization with the scanning dither mirror, the beam is projected as two beams which are alternately scanned in orthogonal directions and orthogonally oriented with respect to each other to provide respective pitch and yaw information.

It is an object of the present invention to provide a compact and accurately controlled beam projector having a minimum number of mechanically movable parts.

It is another object of the present invention to provide a beam projector which transmits orthogonal beams of radiation having identical predetermined cross-sectional sizes utilizing a relatively fixed lens system.

It is a further object of the present invention to provide a controlled beam projector which projects a matrix of detectable pulse rate bins controlled in size to remain substantially constant with respect to a missile, having a known flight path and guided by said matrix of detectable information.

It is a still further object of the present invention to provide a beam projector which achieves beam rotation and derotation by utilizing principals of frustated total internal reflection with a plurality of prism elements.

FIG. 1 illustrates an improved embodiment of the subject invention utilizing a single source of radiation and a modulated frustrated total internal reflection type beam rotator in a relatively fixed lens system for effecting alternate transmission of two orthogonally oriented beams.

FIG. 2 illustrates the proportionately differing cross-sections of the radiation which are selectively transmitted by the radiation generating means shown in FIG. 1.

FIG. 3 illustrates various control operations occuring over a period of time.

FIG. 4A is a schematic illustration of the various parameters considered in the projection of the controlled radiation pattern over a typical flight path of a missile.

FIG. 4B is a schematic illustration of the scanning pattern of the alternately projected beams of radiation at the low end of the range of the correspondingly selected light source.

FIG. 4C is a schematic representation of the light beam pattern at the extreme end of the radiation scan pattern for the selected radiation source.

Figure 5:
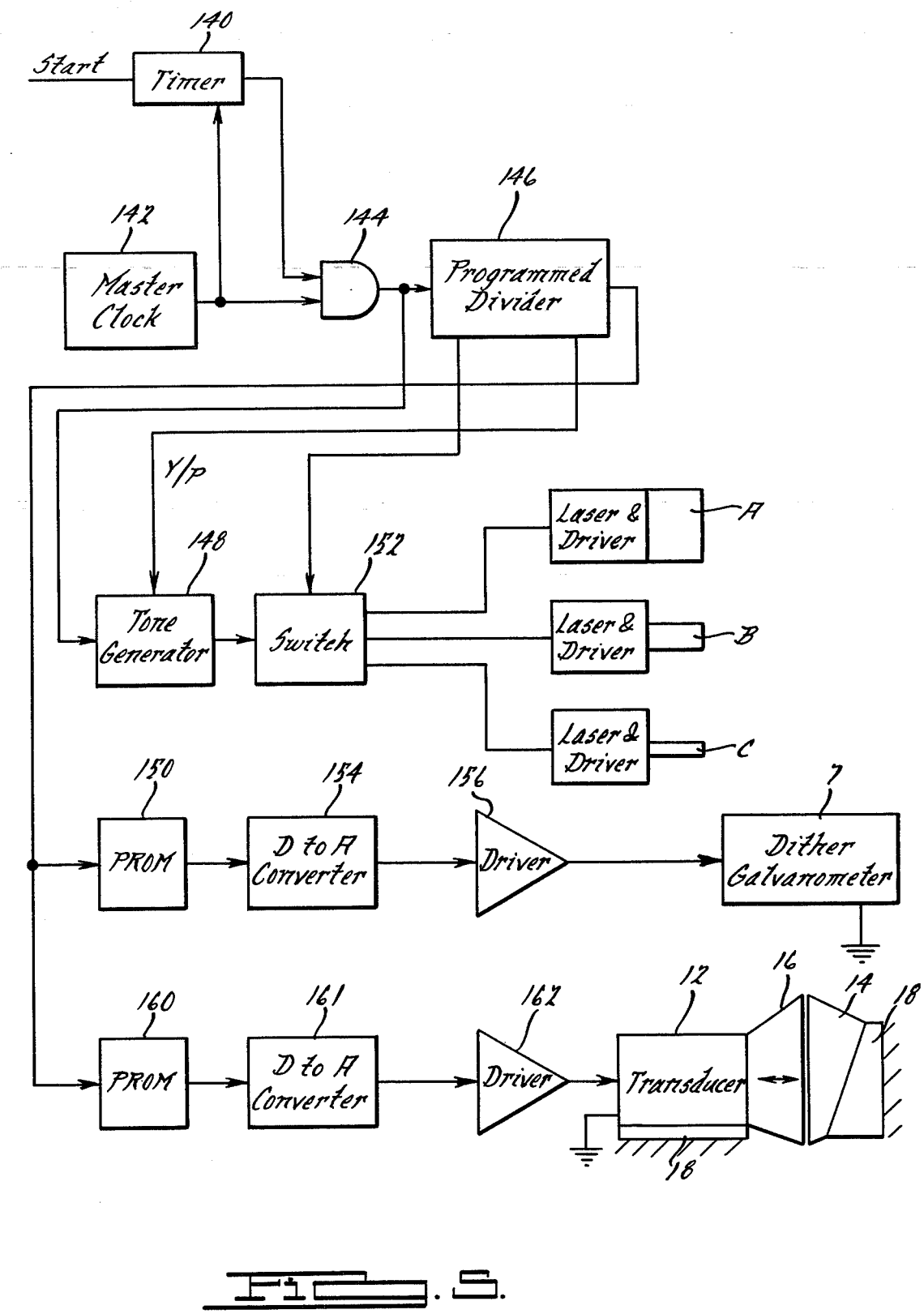
FIG. 5 is a block diagram illustrating an electrical control system for use in the improved embodiment of the present invention.

In FIGS. 4A, 4B, and 4C, a projected guidance pattern is illustrated over a hypothetical control range of approximately 3000 meters. The embodiment of the present invention is described herein with respect to the exemplified range of control. However, it should be understood that in each instance where specific measurements are given, in order to illustrate particular design parameters, such measurements are not restrictive of the scope of the present invention.

The improved embodiment of the present invention is shown in FIG. 1, wherein pitch (P) and yaw (Y) information beams of radiation are alternately projected from a single source 2. The source 2 comprises three Ga-As lasers, which are optically interfaced to clad glass rectangular fibers in an assembly format 3 (shown in FIG. 2). The clad glass fiber assembly 3 has three separate rectangular channels for conducting radiation from a correspondingly associated laser generator. Each rectangular channel, A, B, and C, has a proportionately different cross-sectional size for transmitting a rectangular cross-section beam 4 in correspondence with the particular individual laser which is selectively driven. In this embodiment, only one laser is driven at a time, in order to transmit a single beam having a desired cross-section.

A dither mirror 6, mounted on a shaft 9, interrupts the beam 4 transmitted from the source 2 and reflectively scans the beam over a predetermined angle α in a direction orthogonal to the length dimension of the rectangular cross-section of the beam 4. The shaft 9 is rotated for sinusoidal oscillatory motion through the predetermined angle α about an axis, which interrupts the path of beam 4, by a controlled galvanometer 7.

A prismatic beam rotator 10 interrupts the beam 4 after it is reflected from the dither mirror 6. The beam rotator 10 is shown as a Pechan type prism having its reversion axis at 45° with respect to the length dimension of the incoming beam 4. A receiving element 14 of the rotator 10 is rigidly mounted on a base 18, in common with all the other fixed elements of the system, to receive the incoming beam 4 at its unsilvered receiving face 22. Transmitting element 16 is mounted for reciprocating movement towards and away from the major unsilvered face 20 of the receiving element 14 by a vibrational transducer 12. The beam rotator 10 has two states which are dependent upon the relative locations of the two prism elements.

In the first state, the beam rotator 10 functions as a Pechan prism. The two prism elements 14 and 16 are evenly separated along their opposing unsilvered major faces 20 and 21 so that the vertically oriented beam entering the receiving face 22 of element 14 is internally reflected at major face 20, to a silvered face 24 and back to the major face 20 where it is normally incident. The beam exits major face 20 of the receiving element 14 and enters opposing major face 21 of transmitting element 16. The beam is then internally reflected from an exit face 28 to a silvered face 26, to major face 21 where it is internally reflected normal to the exit face 28 and transmitted as a horizontally oriented P beam rotated by 90° with respect to the incoming beam.

In the second state, the beam rotator 10 functions as a transmission window. The two prism elements 14 and 16 are in optical contact along their opposing major faces 20 and 21 to frustrate internal reflection at those faces. Therefore, the vertically oriented beam entering the receiving face 22 passes directly through the element 16, the contacting major surfaces 20 and 21, and exits unsilvered face 28 of the transmitting element 16 as a vertically oriented beam. In the second state, the orientation of the beam is unaffected. This vertically oriented beam is projected by projection lens system 30 as a Y information beam oriented 90° with respect to the P beam (first state).

Operation of the embodiment is explained by referring to FIG. 3. A single laser in source 2 is synchronously tone modulated to transmit a beam 4 which is generally vertical with respect to a reference plane. At the beginning of the time cycle, the dither mirror 6 is at an extreme point of the predetermined scanned angle α and commences its rotational motion through that angle. For the 50 Hz time cycles in FIG. 3, the P beam is shown as being projected first. Therefore, during the first half cycle of the oscillatory rotation of the dither mirror 6, through the predetermined angle α, the major surfaces 20 and 21 of the rotator 10 are separated to effect rotation of the beam 4. Also during the period of the first half cycle that the dither mirror 6 is rotated, the selected laser of source 2 is pulse modulated over a first range of frequencies. Therefore, a P beam having a relatively horizontally oriented cross-section and continually changing pulse modulation frequency is projected and scanned in a relatively vertical direction.

When the dither mirror 6 reaches the limit of its first half cycle of angular rotation, a dead period of image rotation is provided, of approximately 2.5 ms, wherein the selected laser is not modulated and the major surfaces 20 and 21 are moved into contact with each other to frustrate internal reflection and transmit the unrotated beam. The dither mirror 6 then synchronously begins rotation in its second half cycle of oscillatory rotation through the predetermined angle α. During that second half cycle, the selected laser is pulse modulated over a second range of frequencies and the beam is transmitted, without rotation, through the beam rotator 10. Therefore, the Y beam is projected having a relatively vertically oriented cross-section and is scanned in a relatively horizontal direction.

The present invention has particular application in missile guidance systems, wherein the missile has a receiver with appropriate demodulation and logic electronics on board so as to enable the missile to respond to information received from the radiated beams. By identifying the two received pulse frequencies for the respectively received P and Y beams, the receiver will be able to determine the missile location within the projected pattern and command certain steering corrections to the missile. In FIGS. 4A, 4B, and 4C, the projected information pattern is conceptually illustrated as an aid in describing the desired objectives obtained by the present invention.

FIG. 4A illustrates a hypothetical flight range of 3000 meters for a hypothetical missile which is to be guided by this system. Guidance is programmed to begin when the missile is 111 meters down-range from the beam projector of the present invention. The system also requires, in this embodiment, that the missile move away from the beam projector along the line-of-sight path connecting the beam projector and the missile. Guidance of the missile continues as long as the missile receives guidance information. In this case, 3000 meters is the known maximum range of the missile, and therefore, the maximum range necessary for effective control of the projected information pattern.

During the time the missile is predicted to be in the range from 111 meters to 333 meters, the laser associated with the clad glass rectangular fiber A, shown in FIG. 2, is selected for pulse modulation. Since, in this example, the rectangular fiber A has cross-sectional dimensions of 2.76 mm by 0.23 mm and an aspect ratio of 12:1, the resultant projected P beam cross-section measures 6 meters wide and 0.5 meters high at a range of 111 meters. When the P beam is at its lowest point of vertical scan at 111 meters it appears 3 meters below the optical axis of the projector. The P beam scans upward (see FIG. 4B) for 7.5 ms over a distance of 6 meters and then disappears. During this upward scan of the P beam, it is modulated over the first range at 51 different pulse rates in order to define 51 detectable levels within the projected pattern.

Approximately 2.5 ms after the P beam disappears, the Y beam is projected having the same dimensions as the P beam. As referenced by looking from the projector, the Y beam appears 3 meters to the left of the optical axis, at 111 meters down-range, and is scanned 6 meters in the right direction over the next 7.5 ms. During that scan period of 7.5 ms, the Y beam is pulse modulated at 51 different pulse rates in the second range, which is different than the first range of pulse rates for P beam modulation. Therefore, the combination of P and Y beams being swept across a common area in space defines 2601 separate bins of detectable information in a 51×51 matrix format, wherein the center bin corresponds to the optical axis of the projector and desired path of the missile.

It is most important to control the size of the scan pattern over the flight of the missile in order to communicate the same relative location information to the missile regardless of its down-range position. For example, if the missile is 1 meter below and 3 meters to the left of the optic axis, when it is 111 meters down-range, it receives pitch and yaw information corresponding to the particular bin located 1 meter below and 3 meters to the left of the optic axis bin. Therefore, since the objective is to provide a constant sized area of information with respect to the flight path profile, the missile will receive the same bin of pitch and yaw information indicated above at any down-range location where the missile is 1 meter below and 3 meters to the left of the optic axis. Of course, the same holds true for all the other information bins located within the projected pattern of information.

The present invention maintains a constant sized area of information with respect to the predicted flight path function of down-range distance versus time, by varying the dither mirror scan angle $\alpha$ over a predetermined down-range distance d(t). Therefore, during the time the missile is predicted to be moving down-range, the dither mirror 6 is scanned over angle $\alpha = \text{Arctan } h/d(t)$, where h represents the maintained square scan pattern height (and width) of 6 meters. By the time the missile reaches 333 meters, the projected beams have diverged to have a length dimension of 18 meters and a width dimension of 1.5 meters, as is shown in FIG. 4C, by controlling the dither mirror scan angle $\alpha$. Since the beam width derived from the fiber A is so large at 333 meters, the laser associated with fiber A is turned off and the laser behind smaller fiber B is turned on.

The cross-sectional size of the fiber B is 0.914 mm×0.076 mm, and also has an aspect ratio of 12:1. Therefore, the P and Y beam rectangular cross-sections derived from fiber B at 333 meters are 6 meters×0.5 meters, as shown in FIG. 4B, and are scanned over the continually decreasing angle $\alpha$ until the missile distance is predicted to be at 1000 meters. At that point, the P and Y beam cross-sections are the size indicated in FIG. 4C with a 6×6 meter scan pattern size.

At 1000 meters, the laser behind fiber B is turned off, the laser behind smaller fiber C is turned on and is appropriately modulated. The fiber C has dimensions of 0.305 mm×0.025 mm and also has an aspect ratio of 12:1. At 1000 meters, the P and Y projected beams from the C fiber have dimensions of 6 meters×0.5 meters, as shown in FIG. 4B. The beam cross-sections continue to diverge and at 3000 meters they reach dimensions, as shown in FIG. 4C.

The block diagram shown in FIG. 5 is illustrative of how the improved invention is controlled to obtain the desired results.

A master clock 142 generates a train of high frequency pulses to provide accurate timing for the various programmed functions. The output of the master clock 142 is fed to a timer-counter 140, which is preset for the particular missile flight path profile. After a missile fire "start" signal is received, the timer-counter 140 predicts when the missile is at 111 meters down-range and outputs an enabling signal to AND gate 144. At that point, AND gate 144 is enabled to gate pulses from the master clock 142. Gated signals from the AND gate 144 are fed to a programmed divider 146 and to a tone generator 148. The programmed divider 146 is configured to output command signals at predetermined times along the known flight path in order to effect synchronization of proper laser selection, laser modulation, dither mirror scan, and beam rotation. An output of the programmed divider 146 is fed to a PROM 150 which functions as a sine wave look-up table and provides a digital output in response to the count input address. The output of the PROM 150 is fed to a D to A converter 154 where the digital values are converted to a variably controlled amplitude 50 Hz analog sine wave. The analog sine wave is amplified by driver 156 and controls the angular movement of the dither mirror through dither galvanometer 7.

The output of the programmed divider fed to the PROM 150 is also fed to a PROM 160, which functions as a sine wave look-up table and provides a digital response to the count input address. The output of the PROM 160 is fed to a D to A converter 161 where the digital values are converted to a constant amplitude 50 Hz analog sine wave. The output of the D to A converter 161 is fed to a driver 162 for amplification; and the amplified output is fed to the piezoelectric transducer 12 for vibrationally modulating element 16 of the beam rotator 10.

The programmed divider 146 also supplies a pitch/yaw beam signal to a tone generator 148 which provides 51 steps of pulse rates to a selected laser/driver over separate ranges for each respective pitch or yaw beam transmission. An electronic switch 152 is controlled by the output of the programmed divider 146 to select the desired laser/driver size format which receives the tone generator output.

It is apparent that many modifications and variations may be effected without departing from the scope of the novel concepts of this invention. Therefore, it is intended by the appended claims to cover all such modifications and variations which fall within the true spirit and scope of the invention.

I claim:

1. In a controlled beam projector, which includes:
   a source of radiation controllable to emit a generally rectangular cross-sectional beam;
   a scanner located to receive said emitted radiation and to scan said radiation over a predetermined frequency and predetermined angle in a direction orthogonal to the length dimension of said beam cross-section;
   a fixed lens optical system located to receive said scanned radiation and to project said emitted radiation in alternate first and second scanned beams having their respective cross-sectional length dimensions orthogonally oriented with respect to each other;
   a modulator for pulse modulating said source of radiation at a plurality of pulse rates over first and second predetermined ranges of frequencies corresponding to said first and second scanned beams;
   a scan circuit associated with said scanner for controlling the angle of scan in accordance with a predetermined time variable function; and
   means programmed for generating said time variable function and supplying synchronizing signals to said modulator and said scan circuit so that said pulse modulated radiation over said first and second predetermined ranges of frequencies occurs within the controlled angle of scan corresponding to respective said first and second projected scanned beams; an improvement comprising:
   a beam rotator within said fixed lens optical system, including first and second prism elements, wherein said first prism element is fixedly mounted to receive said beam from said scanner and transmit said beam from a major optical transmitting face to an opposing major optical transmitting face of said second prism element, and wherein said second prism element is mounted for movement with respect to said first prism element;
   a vibration transducer mounted to effect cyclical movement of said second prism element between a first state where said first and second prism elements are evenly separated over opposing major optical transmitting faces and a second state where said first and second prism elements are in optical contact along said opposite major faces; and
   circuitry for driving said transducer at a frequency corresponding to said scan frequency.

2. An improved controlled beam projector as in claim 1, wherein said source comprises a plurality of radiation generators mounted to emit beams of radiation having proportionately different cross-sectional length and width dimensions,
   and said programmed means selects an individual one, of said plurality of radiation generators for modulation by said modulator, in accordance with said time variable function.

3. An improved controlled beam projector as in claim 1, wherein said first and second prism elements form a Pechan prism when said second prism element is in said first state for rotating said incoming beam and forms a non-rotating transmission block when said second prism element is in said second state.

4. An improved controlled beam projector as in claim 3, wherein said formed Pechan prism has a reversion axis oriented at an angle of 45° with respect to the length of said rectangular cross-sectional beam.

5. In a controlled beam projector, which includes:
   means for selectively generating a beam of radiation having a generally rectangular cross-sectional area;
   means located to receive said beam of radiation for scanning said beam over at least one predetermined path orthogonal to the length of said beam cross-section;
   means located in the path of said scan beam for optically projecting said beam as two alternately scanned beams having said cross-sectional length dimensions orthogonally oriented with respect to each other; an improvement comprising:
   first and second prism elements, within said projecting means, wherein said first prism element receives and transmits said scanned beam and said second prism element receives and transmits said beam from said first prism element;
   means for mounting said first and second prism elements for relative movement with respect to each other along said beam path; and
   a transducer element on said mounting means for effecting said relative movement of said prism element between a first position where said prism elements are separated along said beam path and a second position where said prism elements are in optical contact along said beam path.

6. A controlled beam projector as in claim 5, wherein said first and second prism elements form a Pechan prism when said prism elements are in said first position and said Pechan prism has a reversion axis oriented 45° with respect to the length of said rectangular cross-sectional beam to effect 90° rotation of said beam cross-section.

7. A controlled beam projector as in claim 6, further including means for driving said transducer element at a constant amplitude predetermined frequency.

8. A controlled beam projector as in claim 7, wherein said scanning means includes a rotatable dither mirror, a galvanometer for rotating the dither mirror and a drive circuit for controlling said galvanometer to effect rotation of said dither mirror through a variable angle at a fixed frequency which corresponds to said predetermined frequency at which said transducer is driven.

* * * * *